United States Patent [19]
Brendel et al.

[11] Patent Number: 4,536,921
[45] Date of Patent: Aug. 27, 1985

[54] CABLE CLAMP

[75] Inventors: Richard Brendel, Pottenstein; Herbert Conrad, Bayreuth, both of Fed. Rep. of Germany

[73] Assignee: Geroh GmbH, Mechanische Systeme, Waischenfeld, Fed. Rep. of Germany

[21] Appl. No.: 436,912

[22] Filed: Oct. 27, 1982

[30] Foreign Application Priority Data

Oct. 30, 1981 [DE] Fed. Rep. of Germany ....... 3143217
May 12, 1982 [DE] Fed. Rep. of Germany ....... 3217885

[51] Int. Cl.$^3$ .............................................. F16G 11/00
[52] U.S. Cl. ........................... 24/132 WL; 24/136 K; 24/568; 269/233; 269/239
[58] Field of Search ............ 24/115 M, 134 L, 134 R, 24/134 KB, 132 R, 132 WL, 136 R, 136 K, 136 L, 136 B, 503, 505, 506, 513, 517, 522, 524, 528, 527, 538–541; 269/233, 239; 403/210

[56] References Cited

U.S. PATENT DOCUMENTS

| | | | |
|---|---|---|---|
| 319,748 | 6/1885 | Rein | 269/233 |
| 322,026 | 7/1885 | Walters et al. | 24/248 E X |
| 949,411 | 2/1910 | Bergh | 269/233 X |
| 998,014 | 7/1911 | Kingsley | 269/233 X |
| 2,372,754 | 4/1945 | Wickens | 24/136 K |
| 2,540,888 | 2/1951 | Hyatt | 24/134 R X |
| 2,561,514 | 7/1951 | Houseman | 24/134 L |
| 2,608,731 | 9/1952 | Summers | 24/132 R X |
| 2,970,357 | 2/1961 | Pinson et al. | 24/134 R X |
| 3,905,711 | 9/1975 | Rogers | 24/115 M X |
| 4,250,734 | 2/1981 | Tinsley | 24/136 R X |

FOREIGN PATENT DOCUMENTS

519610 12/1955 Canada .............................. 24/136 R

Primary Examiner—William E. Lyddane
Assistant Examiner—James R. Brittain
Attorney, Agent, or Firm—Mason, Kolehmainen, Rathburn & Wyss

[57] ABSTRACT

Cable clamp with jaws and a wedge.

The invention deals with a cable clamp having clamping jaws, a clamping wedge and locking means. The clamp can work as a cable joint and, according to the invention, has the following individual parts:

(a) a base with a fastening device for supporting the clamp on the upper end thereof and including a clamping surface for securing the cable, (b) an angular clamping jaw hingedly attached on the upper end of the base, (c) a clamping wedge guided by a cross-piece slidable between the base and the clamping jaw and having an adjustable or fixedly positioned carrier bolt thereon and, (d) a breechblock-mechanism which partially embraces the clamping jaw, and which is pivotally attached at the lower end of the clamping jaw having first, curved surfaces for engaging a carrier bolt mounted on the wedge for carrying and pressing the clamping wedge into a clamping position; second surfaces engageable with a bolt on the base for moving the clamping jaw and base toward each other at the lower end, a closing system for holding the base and jaw in a cable tensioning position, and a locking system for securing a cable in a clamping position.

11 Claims, 20 Drawing Figures

FIG. 7
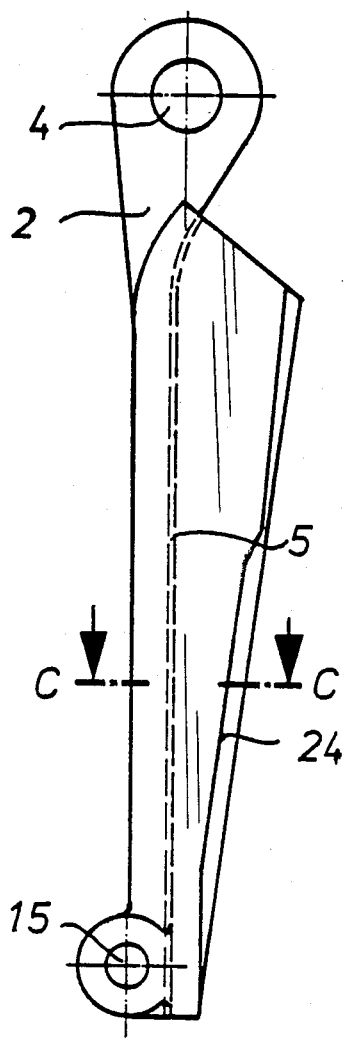
FIG. 9
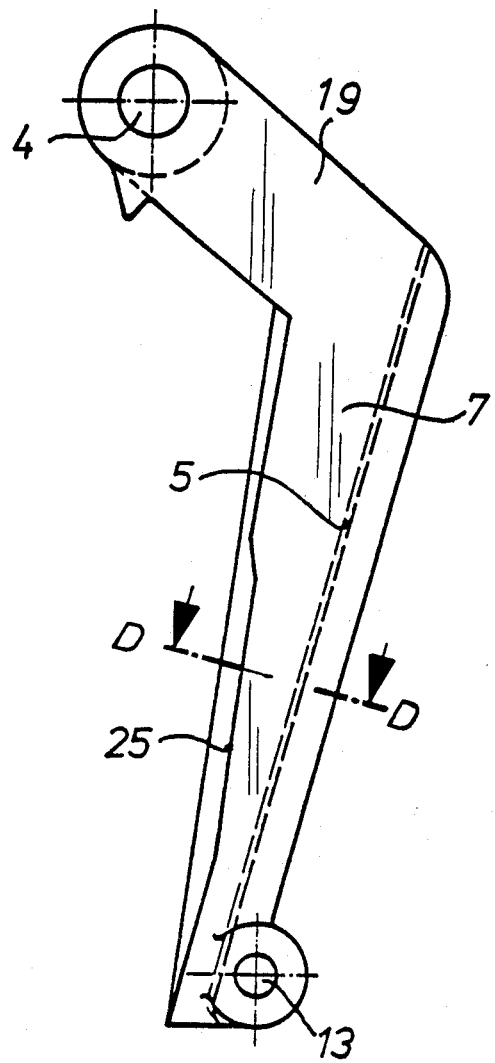
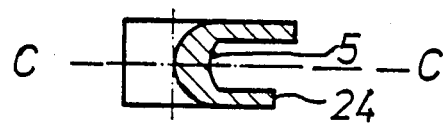
FIG. 8
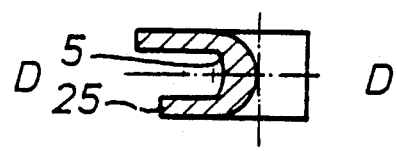
FIG. 10

CABLE CLAMP

BACKGROUND OF THE INVENTION

1. Field of the Invention

The invention deals with a cable clamp having clamping jaws, a clamping wedge and locking means.

2. Description of the Prior Art

From the German Industrial Standard (DIN) 15315 there is already known a drilling clamp in the form of a cable joint for hoists, which consists of a cable joint housing and a cable wedge. The cable wedge, over which the cable is carried, is inserted into the cable joint housing, which is closed on all sides. As a result of the stress placed on the cable, the cable is firmly inserted between the surfaces of the cable wedge and the clamping surfaces of the cable joint housing. The disadvantage with such a cable joint is that the cable must be threaded into the device in a relatively laborious way, and that with a cable joint of this type, a change in the unclamped cable can be made only with a lot of work.

In addition, there is known from the German Industrial Standard (DIN) 48330 a parallel clamp used for open-air transmission lines for telecommunications, in which the open-air line to be clamped (which can also consist of bare wire) is clamped between two clamping jaws which are moved against each other during the clamping process. With a previously known parallel clamp of this kind, the unhooking of random wire or cable lengths is easily possible, of course, but random tractions can Industrial Standard (DIN) 48330 a parallel clamp used for open-air transmission lines for telecommunications, in which the open-air line to be clamped (which can also consist of bare wire) is clamped between two clamping jaws which are moved against each other duribecause of slippage of the wire or the cable between the parallel clamps.

OBJECTS AND ADVANTAGES OF THE INVENTION

An object of the invention presented herein is to provide a drilling clamp which is easier to operate, in which a cable or even a bare wire or rope can be inserted simply and without further ado at a desired position, without requiring a more complicated threading process, and whereby on the other hand an absolutely secure clamping of the inserted cable, wire or rope is possible.

Another object of the invention is to provide a clamping device which can secure the cable even when the cable is stressed to its stress limit, i.e., a drilling clamp in which there is absolute avoidance of slippage by the inserted cable, wire or rope.

A further advantage of the drilling clamp according to the invention is that the fastening device of the clamp, with which the drilling clamp is fastened at a random fixed point, and the cable end under tension both lie on a straight line when the clamp is in use so that when the cable, wire or rope is unhooked from the drilling clamp, there occurs no buckling of the stressed cable at the outflow end caused by the drilling clamp.

BRIEF SUMMARY OF THE INVENTION

A clamp with clamping jaws, clamping wedge and locking means serves to accomplish the foregoing objects and includes:

(a) a base having a fastening device for supporting the clamp at the upper end and a clamping surface for engaging a cable,
(b) an angular-shaped clamping jaw hingedly attached at the upper end of the base,
(c) a clamping wedge movable between the base and the clamping jaw guided for movement therethrough by means of a guide bar and including an adjustable or fixedly positioned carrier bolt thereon, and
(d) a breechblock-mechanism pivotally mounted at the lower end of the clamping jaw, and partially embracing the clamping jaw having the following features: first surfaces, curved as needed, for driving and pressing the clamping wedge into a clamping position; second surfaces engageable with a pin on the base part, for pressing the clamping jaw and the base part toward each other at the lower end; closing means for holding the base and jaw in a cable tensioning position, and locking means for locking the clamp in a cable clamping position. The second surfaces may be either curved or straight and form an angle of 82° to 88° with a connecting line between said pin and the mounting pivot pin for the clamping jaw when the drilling clamp is in a closed condition.

With a drilling clamp of this type, the insertion of the cable is possible when the clamp is in the open condition without further adjustments, and a more complicated threading process is not required. Under the term "cable" as used here, cables as well as bare wire or rope, particularly wire cable or wire rope are included. A threading process, as required for a cable joint according to DIN 15315, takes up a lot of time and is disadvantageous in those cases where a long cable is supposed to be unhooked at random positions, because during the threading process, the whole remaining cable length, which is not serving the unhooking, would have to be guided through the clamping device.

This complex threading process is not necessary with the drilling clamp of this invention when the clamp is in the opened position, because the cable can be inserted into the clamp at any point along its length at the approximate point at which the cable is supposed to be unhooked, and may then be lashed in place. This is all possible without further ado by shoving the cable through on the end which is to be unhooked, and by pulling out the cable on the open end. In so doing, the drilling clamp is in the half-opened or cable tensioning position. Then while closing the drilling clamp, the cable is clamped between the clamping surfaces on the clamping wedge, the clamping jaw and the base, as will be explained more clearly in the description and the drawings.

In accordance with a preferred aspect of the invention, the insertion of the clamping wedge into the clamp is made easier because the angular clamping jaw of the present clamp has a slot in the upper end through which the clamping wedge can be easily inserted after the cable is wrapped around the wedge.

In an additional preferred aspect of the invention, the breechblock-mechanism has an appropriate hump-shaped elevation which engages a pin carried by the clamping wedge, and while the clamp is opening, the clamping wedge is moved into a non-clamping position, thus making it possible to retighten the cable as desired.

In an additional preferred aspect of the invention, the closing and/or locking means comprises a clamping nut which engages the breechblock-mechanism, thereby making it possible in a simple way to secure the clamp in a cable tensioning position and/or in a cable clamping position.

In an additional preferred aspect, a movable lug is mounted on the breechblock-mechanism of the drilling clamp, in order to effect an easier opening of the drilling clamp by pulling on the lug.

In an additional preferred aspect, curvatures on first surfaces of the breechblock-mechanism are designed in such a way that when closing the breechblock-mechanism, a dead center point is overcome, and the breechblock-mechanism is thereby held in the clamping position automatically so that in the clamping position, it is not necessary to hold the breechblock-mechanism in the closed position during the clamping procedure.

In a model having straight first surfaces, an angle between these surfaces and a connecting line between a bolt on the base and a pivot pin for the breechblock on the jaw is preferably between values of 84° and 86° when the clamp is closed, and an angle of 85° has proved to be most suitable.

In accordance with a preferred aspect, the breechblock-mechanism is reinforced in the area of a segment thereof which forms the first and second surfaces, because the breechblock-mechanism is most susceptible to fracture in these areas when subjected to excessive stress.

In accordance with an additional preferred aspect of the invention, the closing and locking means includes a nut and a removable spring washer, which are mounted on a bolt on the base. The nut engages a locking depression on the breechblock when the clamp is in a closed condition and the drilling clamp can be opened only when the spring washer is first taken off the bolt and the nut completely unscrewed. In practice this feature has proved to be advantageous, because it is thus impossible to completely open the drilling clamp unintentionally and thereby permit the clamping wedge to fall out. As previously explained, only after removing the spring washer can the nut be screwed out far enough so that the locking depression is avoided, resulting in a possibility that the clamp could completely open.

On the clamping wedge there is an adjustable or fixedly positioned carrier bolt. The carrier bolt is movable within an oblong hole in the wedge or the carrier bolt can be fixed in a selected one of several bores in a desired position. With the fixed model several spaced apart bores may be provided in the clamping wedge and the carrier bolt can be inserted into a selected bore, depending on the strength of the cable that is being clamped. This arrangement is an alternative compared to the embodiment wherein the carrier bolt is slidably disposed in an oblong hole. The embodiment having fixed holes in which the carrier bolt can be inserted as desired has the advantage that an exact fixation is already specified, and that the drilling clamp cannot become unsuitable because of possible loosening of the fastening device.

With another preferred aspect of the invention, a rotating casing is mounted on a pin, so that the second surfaces may slide more easily. With this feature, the pin is firmly compressed and held by the base, and for fixing one clamping member there is provided a circlip, while the other clamping member is held by the nut with a removable spring washer in place.

With another preferred aspect of the invention, an eccentrically arranged roller with lever is attached on the breechblock-mechanism to make it easier to open the drilling clamp. This feature enables the clamp to be opened more easily and safely.

BRIEF DESCRIPTION OF THE DRAWINGS

The apparatus of this invention will be explained more closely in reference to the drawings.

FIG. 1 is a side elevational view of a drilling clamp in accordance with the invention shown in an open position for inserting a clamping wedge;

FIG. 2 is a view of the drilling clamp of FIG. 1 shown after closing the clamp to a cable tensioning position;

FIG. 3 is a view of the drilling clamp of FIG. 1 shown in a closed and cable clamping position;

FIG. 4 is a side elevational view of a another embodiment of a clamp shown in a cable tensioning position, and a clamping wedge is insertable from an upper end through a slot;

FIG. 7 is a side elevational view of a base of the clamp;

FIG. 8 is a cross-sectional view through the base along cutting line C—C of FIG. 7;

FIG. 9 is a side elevational view of an angular clamping jaw of the clamp;

FIG. 10 is a cross-sectional view through the clamping jaw along the cutting line D—D of FIG. 9;

FIG. 11 is a side elevational view of a breechblock-mechanism of the clamp;

FIG. 16 is a side elevational view of another embodiment of a clamp shown in an open position generally corresponding to the view of FIG. 1;

FIG. 17 is a side elevational view of the drilling clamp of FIG. 17 shown in a clamping position, generally corresponding to the view of FIG. 2;

FIG. 20 is a side elevational view of another embodiment of a clamp having straight second surfaces and an eccentrically arranged roller for opening the drilling clamp more easily.

DESCRIPTION OF PREFERRED EMBODIMENTS OF THE INVENTION

Figure 1:
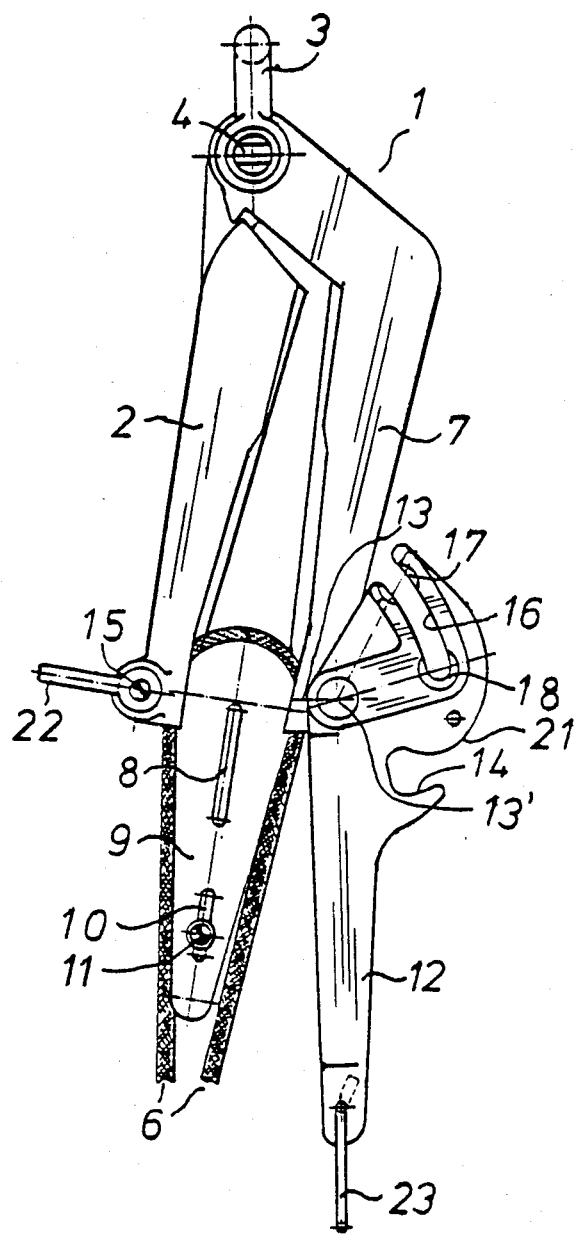
FIGS. 1 through 4 and 11 show an embodiment of a drilling clamping having curved second surfaces.

FIG. 1 shows a drilling clamp in accordance with the invention illustrated in an open condition, and generally designated as 1. The drilling clamp includes a base 2, which is shown in detail in FIGS. 7 and 8, and which has a pivot pin 4 at the upper end, for example, a shackle as a fastening device 3 for supporting the drilling clamp at a desired stopping point. At the pivot pin on the upper end 4 of the base 2, a clamping jaw 7 is hingedly attached to open and close with respect to the base. The clamping jaw 7, shown in detail in FIGS. 9 and 10, is angular in shape. At the lower end of the clamping jaw 7, a breechblock 12 is attached at 13 by means of an articulated rod or pivot pin 13'.

Figure 16:
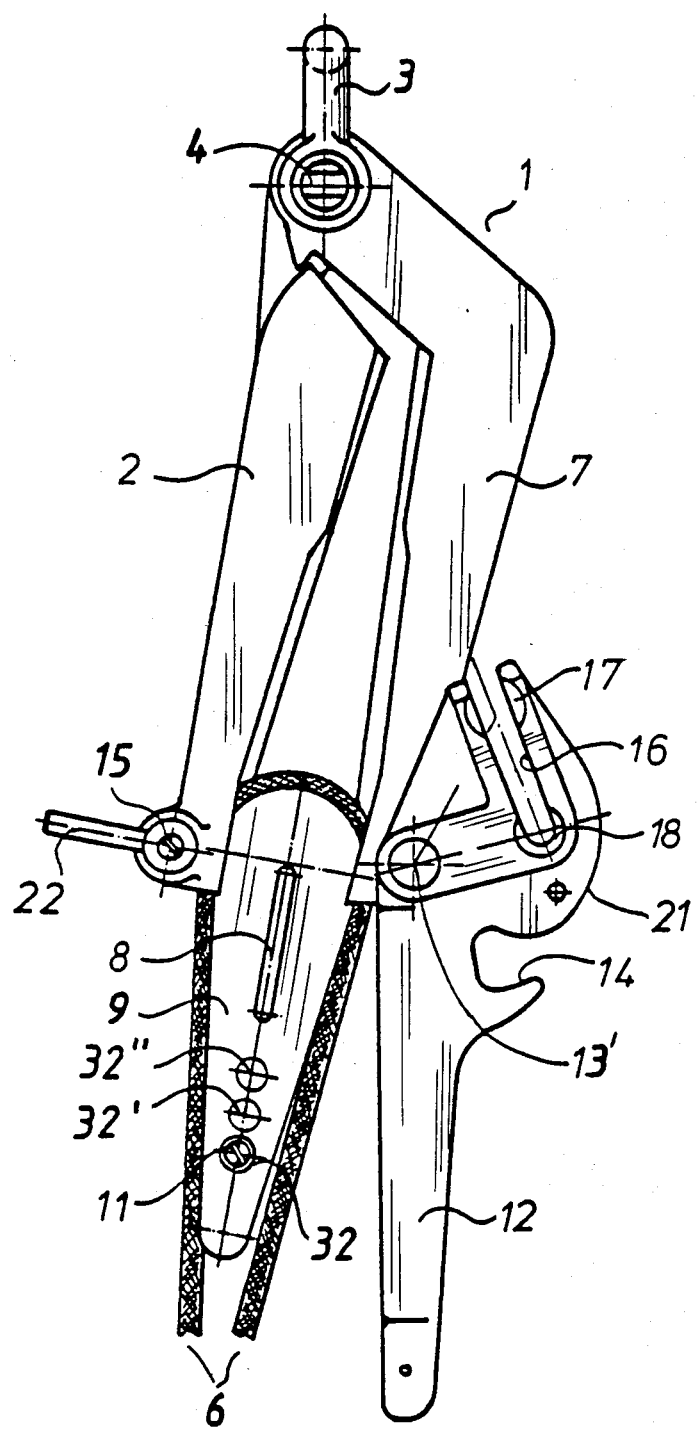
FIGS. 16, 17 and 20 show an embodiment having straight second surfaces. In the drawings.

As can be seen in FIG. 1, a clamping wedge 9 is insertable into the drilling clamp between the base and jaw and includes one or more guide crosspieces 8 for slidably guiding the clamping wedge to move up and down in the clamp and also has an adjustably or fixed carrier bolt 11. This carrier bolt 11 can either be mounted in an oblong hole 10 for sliding movement as is clearly seen in FIG. 1, or can be inserted in a selected one of several spaced apart bores 32, 32', 32" as shown in FIG. 16, whereby an exact determination of the position of the carrier bolt 11 is possible.

Before being placed in the opened drilling clamp, a cable 6, as shown in FIG. 1, is wrapped around the clamping wedge 9 and the clamping wedge is then shoved upwardly into the drilling clamp in a direction toward the upper end 4. The breechblock 12 is then pivoted in a counter-clockwise direction from the open position of FIG. 1 into a cable tensioning position (FIG. 2) and may be stopped in this position with the aid of a closing depression 17 and a nut 22 carried on a threaded pin 15 mounted on the base at the lower end. In this position, the cable can be retightened by further inserting the cable end 6', which is under tension later, followed by pulling on the cable end 6", which is not under tension.

Figure 3:
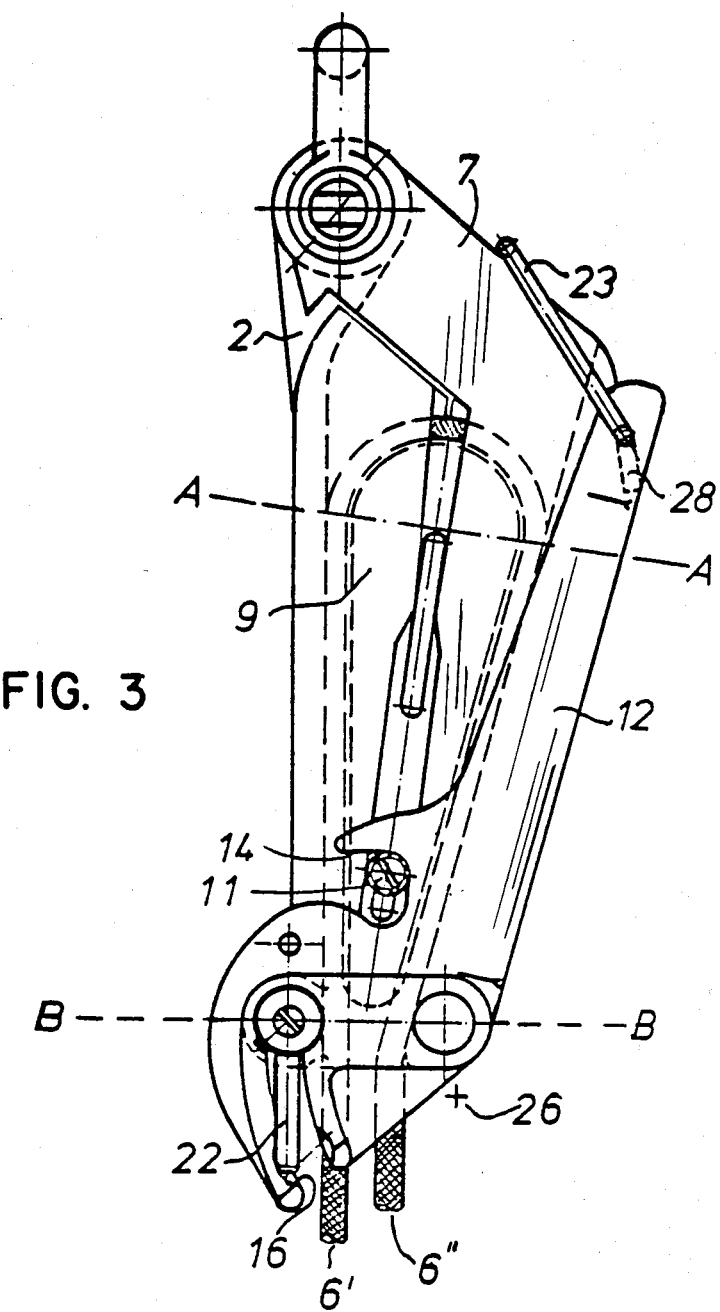
Figure 15:
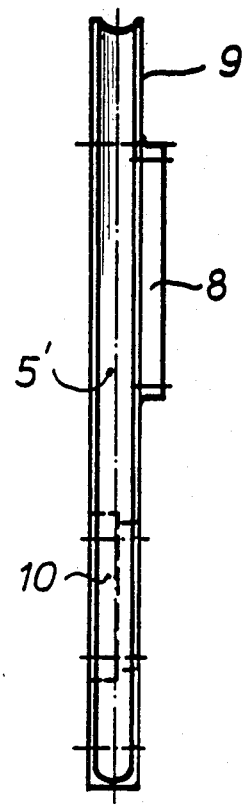
FIG. 15 is an edge elevational view of the clamping wedge of FIG. 14.

The base 2 and the clamping jaw 7 have clamping surfaces that are designated 5 in FIGS. 7 to 10 and these clamping surfaces cooperate with corresponding clamping surfaces 5' of the clamping wedge (see FIG. 15) to clamp and hold the cable after closing the breechblock into a clamping or closed position of the clamp as shown in FIG. 3.

Figure 2:
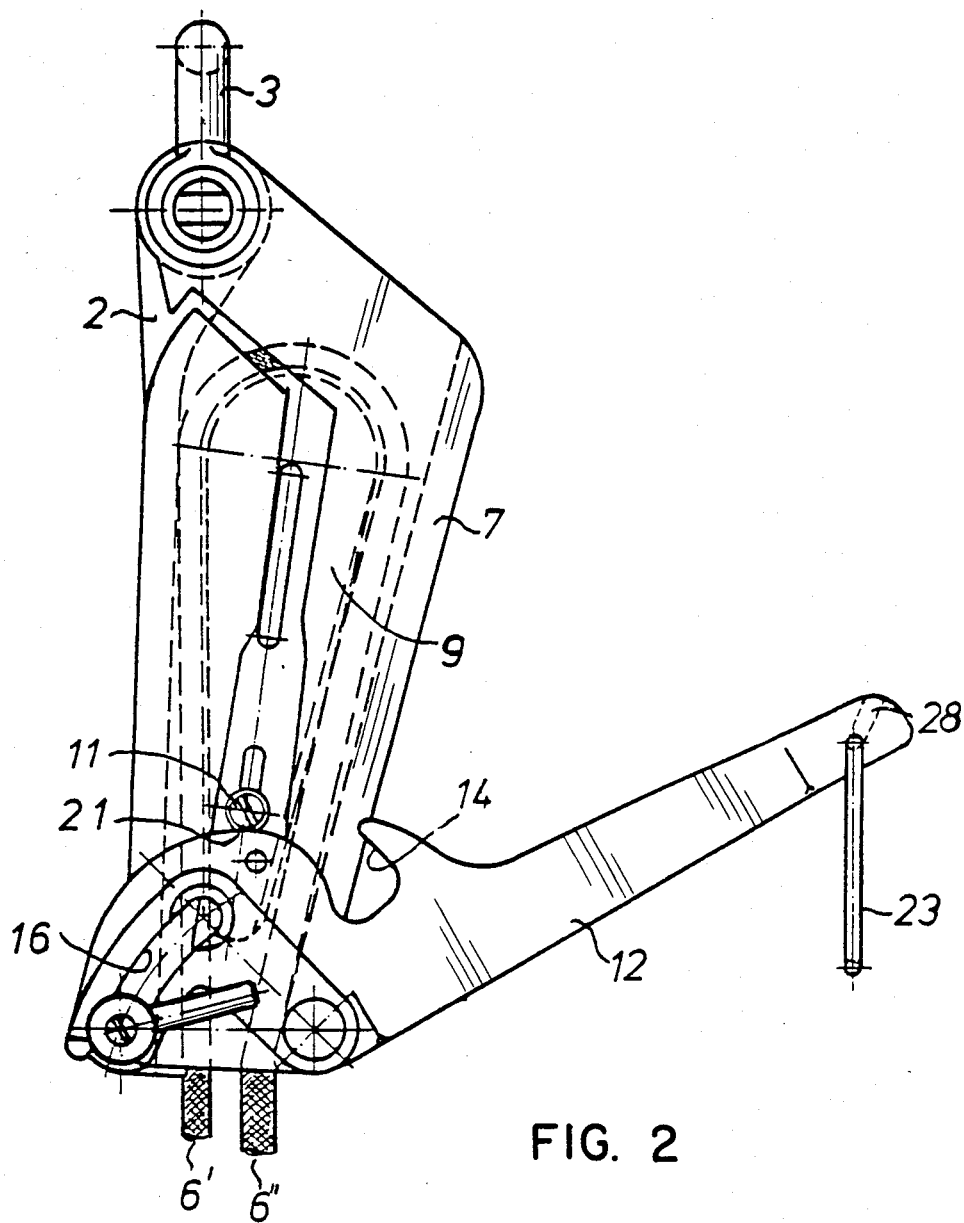

As seen in FIG. 2, the breechblock-mechanism 12 includes second curved surfaces 16 engageable with a pin 15 on the base part and during the pivotal movement of the breechblock-mechanism in a counter-clockwise direction toward the clamping position the surfaces 16 move the lower end of the clamping jaw 7 toward the lower end of the base part 2, so that the distance between the these members becomes less, and the cable is clamped between the clamping surfaces 5' of clamping wedge 9 and the clamping surfaces 5 on the base 2 and the clamping jaw 7. As is further seen from FIGS. 2 and 3, that the breechblock 12 also has a first curved surface 14 in a form which is depicted in the drawing, and this surface engages the carrier bolt 11 on the clamping wedge 9 in the final phase of the closing procedure and forces the clamping wedge downwardly so that the cable 6 is securely clamped between the clamping surfaces 5 and 5'.

In order to be able to use the drilling clamp for cables of various diameters, the carrier bolt 11 in the model shown in FIGS. 1 to 4 and 14 is adjustably and is slidable in an oblong hole 10 on the clamping wedge 9, so that the bolt can move over a certain distance, e.g. 10 to 20 mm, and an appropriate position on the clamping wedge 9 is achieved in the closed position of the drilling clamp. Because the carrier bolt 11 is slidable in the oblong hole 10, the fully closed position automatically corresponds to the diameter of the cable that is clamped. Through this automatic adjusting mechanism of the carrier bolt 11 on the wedge 9, the drilling clamp 1 can be set up, for example, for use with cables having diameters of 4 to 6 mm or from 6 to 10 mm and it is not necessary to use a different sized drilling clamp for every different sized cable diameter or variations in the diameter of a single cable.

The base 2 and the clamping jaw 7 have a cross-section that is generally U-shaped, as can be seen in FIGS. 8 to 10, and furthermore, the base and the clamping jaw 7 have recesses on one side (namely the recess 24 on the base 2, see FIGS. 7 and 8, and the recess 25, on the jaw see FIGS. 9 and 10). These recesses are provided because the carrier bolt 11 on clamping wedge 9, is wider than the guide cross-piece 8. The surfaces in the recesses 24 and 25 together with the appropriately dimensioned upper segments of the base 2 and the clamping jaw 7 form the guide surfaces along which the cross-piece 8 and the carrier bolt 11 slide.

Figure 11:
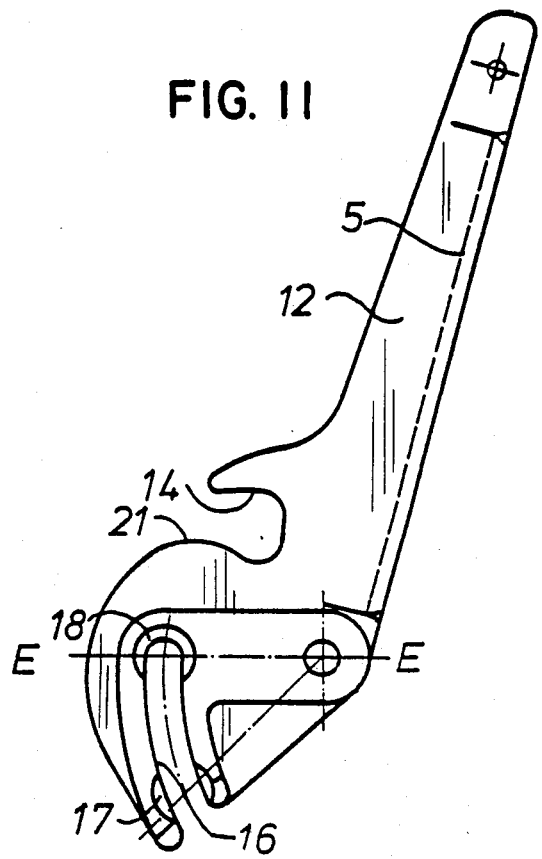
Figure 12:
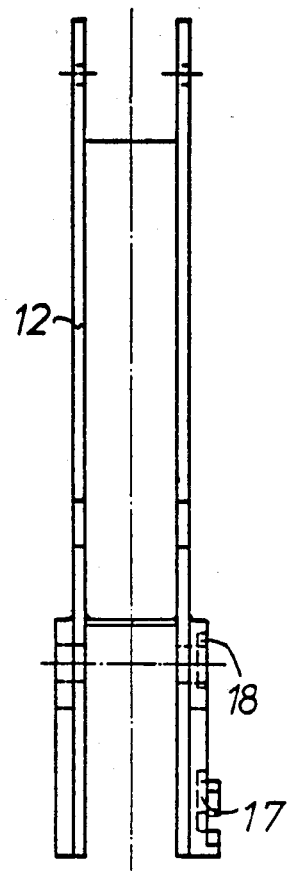
FIG. 12 is an edge view of the breechblock-mechanism of FIG. 11.
Figure 13:
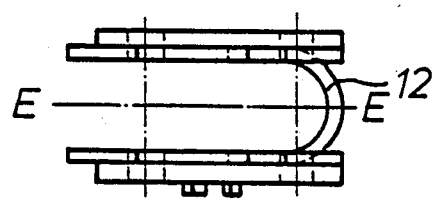
FIG. 13 is a cross-sectional view of the breechblock-mechanism taken along the cutting line E—E of FIG. 11.
Figure 14:
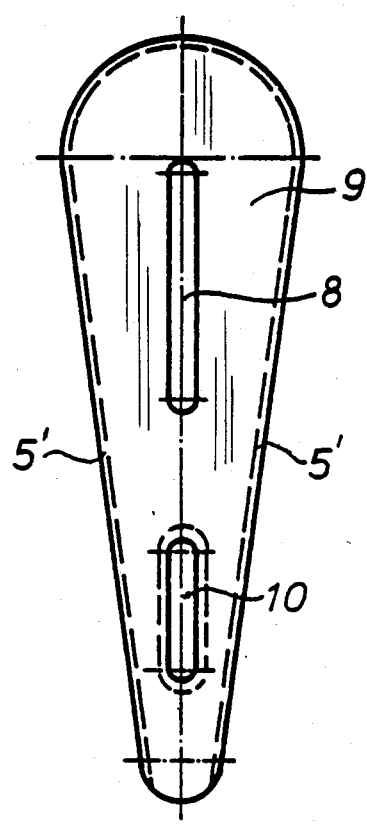
FIG. 14 is a side elevational view of a clamping wedge for the clamp.

The breechblock-mechanism 12 likewise has a generally U-shaped cross-section and partially embraces the clamping jaw 7 when closed as shown in FIG. 3. The breechblock 12 is shown in detail in FIGS. 11 to 13 and FIG. 13 illustrates a transverse cross-section through the breechblock-mechanism along the cutting line E—E of FIG. 11.

The breechblock 12 has first, curved surfaces 14, designed, for carrying and pressing the clamping wedge into the clamping position, and these first surfaces engage the carrier bolt 11 on the clamping wedge 9 at the end of the closing procedure. In addition, the breechblock 12 has second curved surfaces 16 which engage the pin 15 on the base 2 as shown in FIG. 2.

On a preferred model, the curve of these second surfaces 16 is so designed that when closing the breechblock 12 into the clamping position shown in FIG. 3, a dead center point must be overcome, so that the breechblock 12 is no longer able to pivot open into the open position or the cable tensioning position, unless the clamp is positively unlocked. In this way it is possible to provide a more secure operation of the clamp. Passing such a dead center point is accomplished by designing the curve of the second surfaces 16 so that a midpoint 26 thereof lies underneath or below the fulcrum or pivot axis 13 of the pin 13' on the clamping jaw 7. The midpoint of the curve of the second surface 16 is designated as 26 in FIG. 3.

Figure 4:
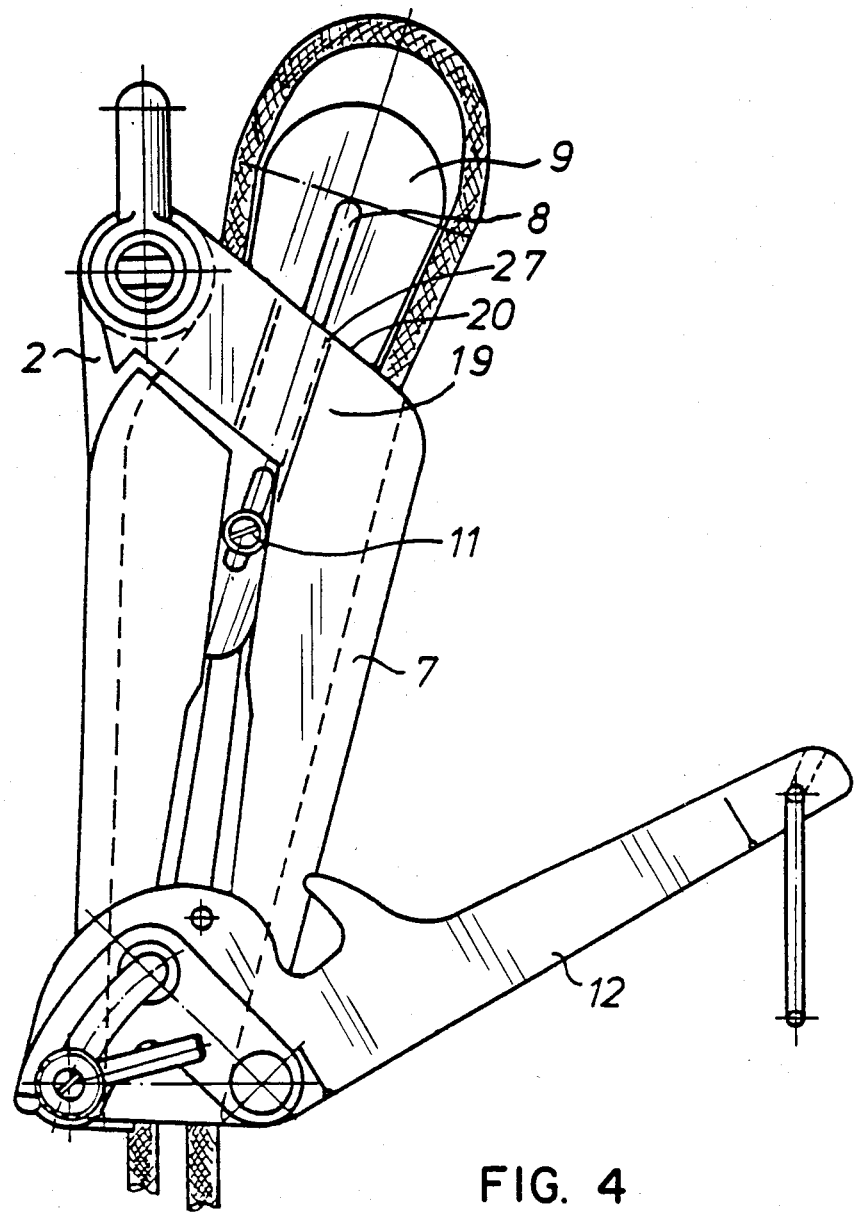

In an advantageous model of the clamp, the clamping wedge 9 can be inserted into position from the upper end of the clamp through a slot 20 in the swivel arm 19 of the jaw 7, as shown in FIG. 4. In the swivel arm 19 not only an appropriately dimensioned slot 20 is provided, but on one side of the surface of the slit a corresponding recess 27 is provided to make it possible for the guide cross-piece 8 and the carrier bolt 11 on the clamping wedge 9 to pass through when inserted from the top.

Figure 5:
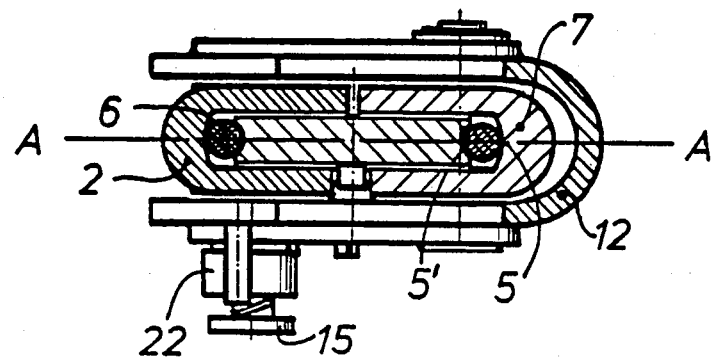
FIG. 5 and FIG. 6 are cross-sectional views of the clamp taken along cutting lines A—A and B—B of FIG. 3.

FIG. 5 shows the clamp in cross-section along the cutting line A—A of FIG. 3, with the clamp in the closed position, whereby the cable 6 is firmly clamped between the clamping surfaces 5 or 5', and the carrier bolt 11 or the guide wedge 8 is guided on the respective guide surfaces.

Figure 6:
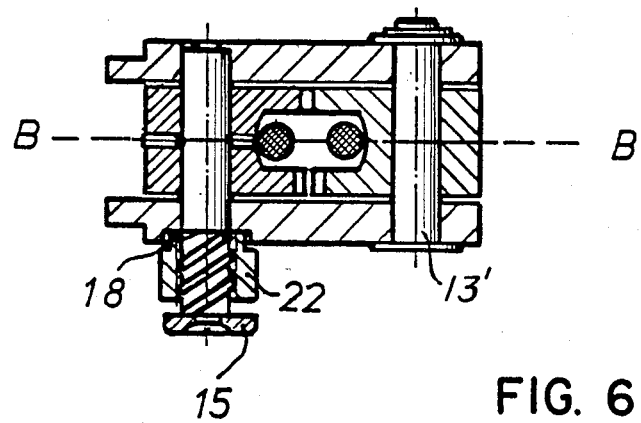

FIG. 6 shows a cross-section along the cutting line B—B of FIG. 3, depicting in greater detail, the locking depression 18 for maintaining the clamp in the clamping position with the aid of a clamping nut 22. The locking depression 18, and the closing depression 17, are spaced at opposite ends of the second guide surfaces 16, see FIG. 1, and by means of pin 15 on the base 2, which pin has a steeply pitched thread, the clamping nut 22 can be lowered into either depression to stop pivotal movement of the breechblock in the respective cable tensioning or closing position.

In the preferred model, as shown in FIGS. 1 to 4, the breechblock 12 has a movable lug 23 which serves to facilitate moving the breechblock-mechanism over a dead center point, after releasing the clamp.

According to another preferred model the breechblock 12 also has a hump-shaped cam surface 21 lying adjacent the second surfaces 16, which cam surface serves to press the clamping wedge 9 upwards while releasing the drilling clamp during movement of the breechblock-mechanism from the clamping position into the cable tensioning position, i.e. out of its clamping position, as this is depicted in FIG. 2.

Instead of the locking depression 18 as shown in the drawings, which works with the clamping nut 22 and the pin 15, the clamp can also be provided with a different locking device. For example, on the upper swivel arm 19 of the clamping jaw 7, an appropriate slit can be provided in which a lug 23 on the breechblock can be secured.

In addition, it is advantageous when the lug 23 has an extension 28 (see FIGS. 2 and 3) which presses against the clamping jaw 7 when the lug is pivoted out of the closed position of FIG. 3, to release and open the clamp and detaches from the clamping jaw 7 via the executed lever effect of the breechblock-mechanism 12.

Figure 17:
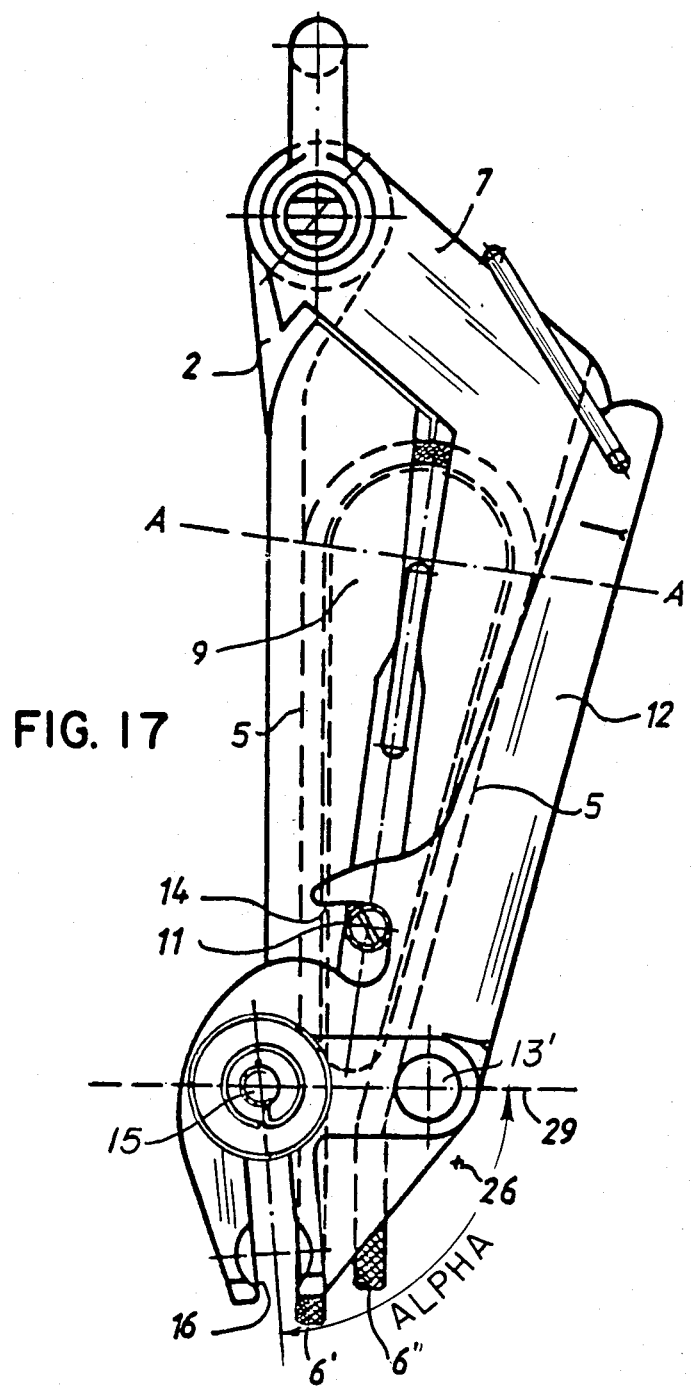
Figure 20:
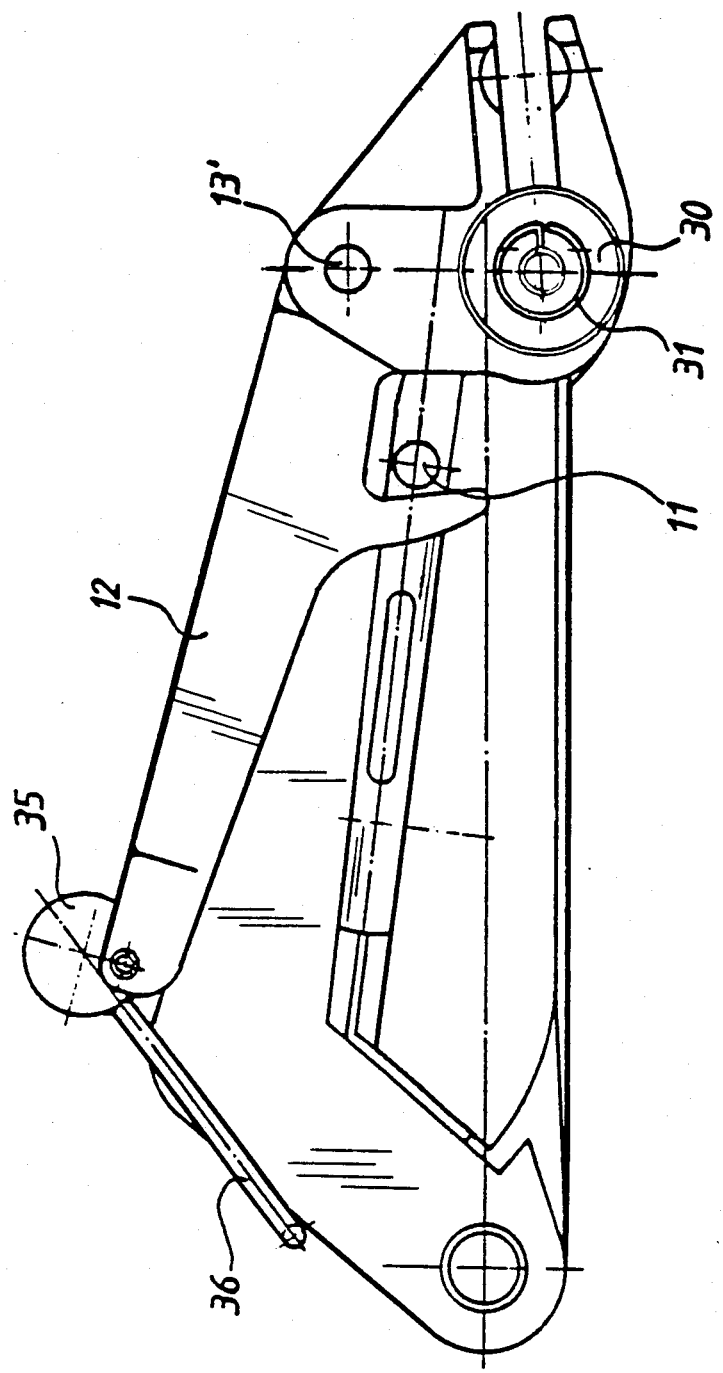

As can be seen in FIGS. 16, 17 and 20, straight second surfaces 16 are provided on the breechblock-mechanism 12 to engage a pin 15 mounted on the base 2, and during pivotal movement of the breechblock from a cable tensioning position to a clamping position the engagement of these surfaces on the pin cause the lower end of the clamping jaw 7 to move toward the lower end of the base 2 so that the distance between becomes less and the cable is firmly clamped between the clamping surface 5' on the clamping wedge 9 and the clamping surfaces 5 on the base 2 and the clamping jaw 7.

The breechblock 12 has first surfaces 14, which engage a carrier bolt 11 on the clamping wedge 9 during the last phase of the closing process and force the clamping wedge downwardly so that the cable 6 is clamped securely between the clamping surfaces 5 and 5'. These first surfaces 14 can either be curved as shown in FIGS. 17 and 18, or they can be straight, as in FIG. 20.

As shown in FIG. 17, the straight second surfaces 16 form an angle "ALPHA" of 82° to 88° with a connecting line 29 running between the midpoint of pin 15 and the midpoint of pin 13' when the clamp is in the closed condition as was explained in greater detail above.

In order to use the clamp with cables of various diameters, the carrier bolt can be inserted as desired into a selected one of several spaced apart bores, 32, 32', 32" provided on the clamping wedge to correspond to a particular cable used. It is thus possible to use the clamp with cables of several different diameters, e.g. diameters of 4, 6, and 8 mm and a specially sized clamp is not necessary for every special cable diameter.

Figure 18:
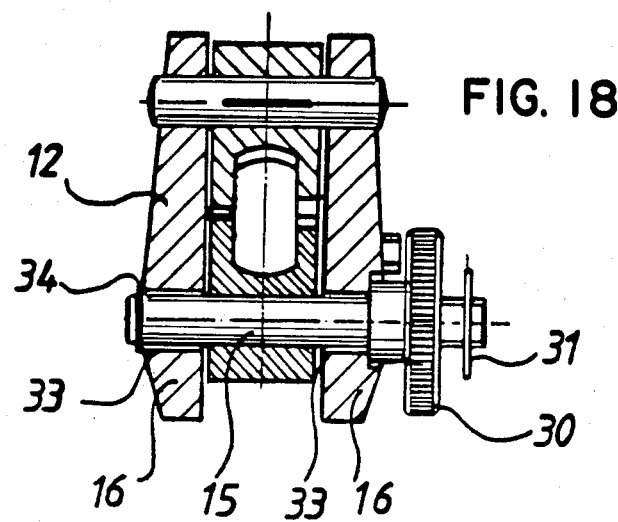
FIG. 18 is a cross-sectional view of the drilling clamp along the connecting lines 29 plotted in FIG. 17.
Figure 19:
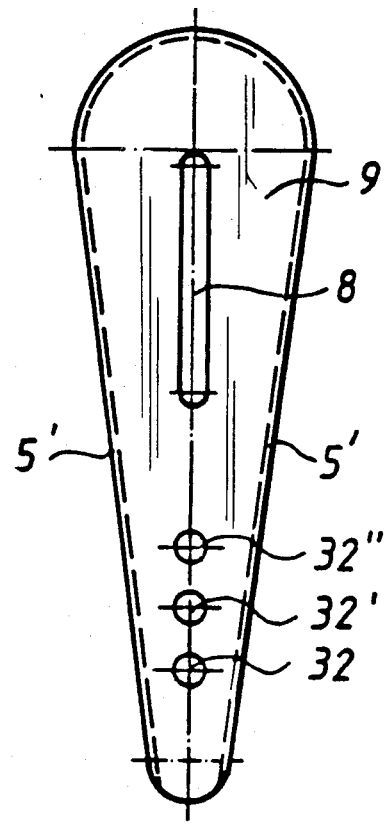
FIG. 19 is a side view of another embodiment of a clamping wedge having individual bores.

The clamping jaw 7 and the base 2 have a generally U-shaped cross-section as shown in FIG. 18, and the breechblock-mechanism 12 is reinforced in area or segment which forms the second surfaces 16, i.e. it has a greater wall thickness than in the other segments. This lessens or eliminates the danger of breakage in the area around the surfaces 16 which are subjected to the greatest stress. The breechblock 12 has a generally U-shaped cross-section and partially embraces the clamping jaw 7 when the clamp is closed.

In another preferred model of the invention, as shown in greater detail in FIG. 20, a roller 35 is eccentrically mounted adjacent the upper end of the breechblock-mechanism and the roller is pivotally activated with a lever 36 for opening the closed drilling clamp. The lever 36 is pivoted upwardly (clockwise) after loosening the nut 30 until the nut engages a removable spring washer. When pivoted as described, the pressure of the eccentric roller forces the breechblock 12 to open away from the clamping jaw 7 to open the clamp.

The clamp has a locking detent or depression 18 for securing the clamp in the clamping position. The depression is located adjacent a closed end of the guide surfaces 16, see FIG. 17 and to lock the clamp closed, the nut 30 is tightened on the bolt 15, which has a thread with a usual pitch until seated in the depression 18 to secure the breechblock-mechanism in the clamping position. The depression 18 is positioned so that when the nut is fully loosened and against a spring washer 31, see FIG. 18, the breechblock may be pivoted from the clamping position toward a cable tension position wherein the nut is positioned adjacent a depression 17 at the outer end of the curved surfaces.

The surfaces of the depression 17 have projections on the outer end adjacent the guide surfaces 16 so that the breechblock 12 will engage the nut 30 on opening up from a closed position (see FIG. 18) so that the breechblock-mechanism cannot pivot out any further toward the open position. Only after removing a C-shaped spring washer 31 from the pin 15 can the nut be moved out further so that the breechblock can be fully opened.

With this arrangement, the clamp can accommodate the insertion of a cable into the clamp when the breechblock 12 is in the cable tensioning position with the clamping wedge 9 already having been inserted, and with the clamp held in the cable tensioning position, the wedge cannot drop out and a more secure operation is thus possible.

The clamp can be made out of appropriate materials, e.g. steel, and the individual parts can be shaped and formed with punches and/or presses, or, in a more advantageous way, the parts can be made of cast material, for instance nodular iron.

Although the present invention has been described with reference to several illustrated embodiments thereof, it should be understood that numerous other modifications and embodiments can be made by those skilled in the art that will fall within the spirit and scope of the principles of this invention.

What is claimed as new and desired to be secured by Letters Patent of the United States is:

1. A cable clamp with clamping jaws, a clamping wedge and a clamping closing and locking device characterized by:
    (a) a base having a fastening device for supporting the clamp at the upper end and including a clamping surface for engaging a cable and a bolt at the lower end with a nut tightenable thereon,
    (b) an angular-shaped clamping jaw pivotally attached on a pivot at the upper end of the base to open and close therewith and including a clamping surface for engaging said cable,
    (c) a clamping wedge mounted to slide between said base and said clamping jaw toward and away from said upper end including guide means and a carrier bolt thereon, said wedge movable upwardly toward a cable releasing position and downwardly toward a cable clamping position, and (d) a breechblock pivotally mounted on a second pin at the lower end of said clamping jaw having first surfaces for driving the carrier bolt and clamping wedge downwardly between said base and jaw into said cable clamping position wherein said cable is wedged and held by clamping surfaces on said jaw and base against said wedge when said breechblock is pivoted towards a closed position, and including second surfaces forming a slot open at the end adapted to engage and receive said bolt on said base for moving the lower ends of said clamping jaw and base toward each other to close said clamp against said cable on said wedge as said breechblock is pivoted towrd a closed position, said breechblock including a closing depression adjacent said slot for receiving said nut when tightened on said bolt to hold said base and jaw in a cable tensioning position intermediate said open and closed positions wherein tension can be applied to said cable by pulling on a free end of said cable, and further including a locking depression adjacent an inner end of said slot for receiving said nut when tightened on said bolt for securing said base and jaw in said cable clamping position tightly against a cable on said wedge, said second surfaces forming an angle of 82° to 88° with a connecting line running between said bolt on said base and said second pin when said clamp is in said cable clamping position.

2. The cable clamp according to claim 1, characterized by the fact that said angular-shaped clamping jaw has an arm at the upper end attached to said base having a slot therein for receiving said clamping wedge with said cable wrapped around and inserted between said base and jaw from the upper end of said clamp.

3. The cable clamp according to claim 1, characterized by a hump-shaped cam surface on said breechblock opposite said second surfaces for moving the clamping wedge toward a non-clamping position while releasing the clamp by pivotal movement of said breechblock.

4. The cable clamp according to claim 1, characterized by said closing and locking depressions being formed at opposite ends of second surfaces of said breechblock.

5. The cable clamp according to claim 1, characterized by the fact that a manually movable lug is pivotally mounted on the breechblock at a free end thereof for engaging the jaw for easier opening of the clamp by pivotal movement of said breechblock away from the upper end of said jaw.

6. The cable clamp according to claim 1, characterized by the fact that said second surfaces are curved relative to said second pin forming a dead center point between the breechblock, jaw and base which is traversed when closing the breechblock by pivotal movement thereof from an open position toward a closed position toward the upper end of said jaw.

7. The cable clamp according to claim 1, characterized by the fact that said breechblock is reinforced in an area which forms said second surfaces that engage said bolt on said base.

8. The cable clamp according to claim 1, characterized by the fact that said closing depression is positioned at an outer end of said second surfaces of said breechblock and said locking depression is positioned at an inner end to receive said nut when said clamp is in said closed, cable clamping position.

9. The cable clamp according to claim 1, characterized by the fact that said clamping wedge is provided with an oblong hole and said carrier bolt is slidably disposed therein.

10. The cable clamp according to claim 1, characterized by the fact that said clamping wedge has several spaced apart bore holes for receiving said carrier bolt which is inserted into a selected one of said holes, depending on the strength of the cable which is to be clamped.

11. The cable clamp according to claim 1, characterized by the fact that an eccentrically arranged roller is mounted on a lever which is pivotally attached to the breechblock at the free end for engaging said jaw to facilitate opening the clamp.

* * * * *